T. SLOPER.
WHEEL RIM FOR PNEUMATIC TIRES.
APPLICATION FILED JAN. 31, 1917.

1,294,313.

Patented Feb. 11, 1919.
2 SHEETS—SHEET 1.

Witnesses.
R. A. Balderson
Rose B. Heller

Inventor.
Thomas Sloper
by Bakewell, Byrnes Parmelee
Attys.

T. SLOPER.
WHEEL RIM FOR PNEUMATIC TIRES.
APPLICATION FILED JAN. 31, 1917.
1,294,313.
Patented Feb. 11, 1919.
2 SHEETS—SHEET 2.
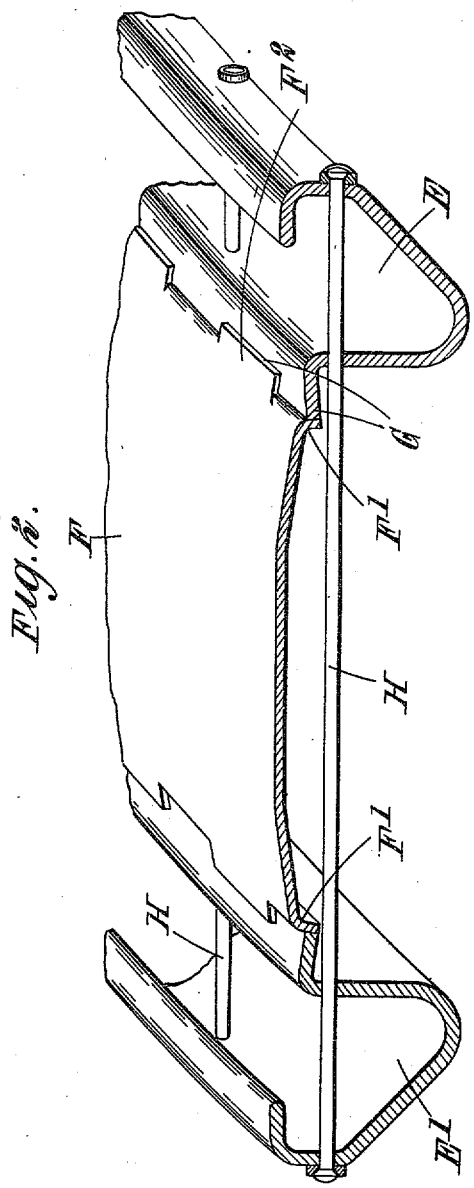
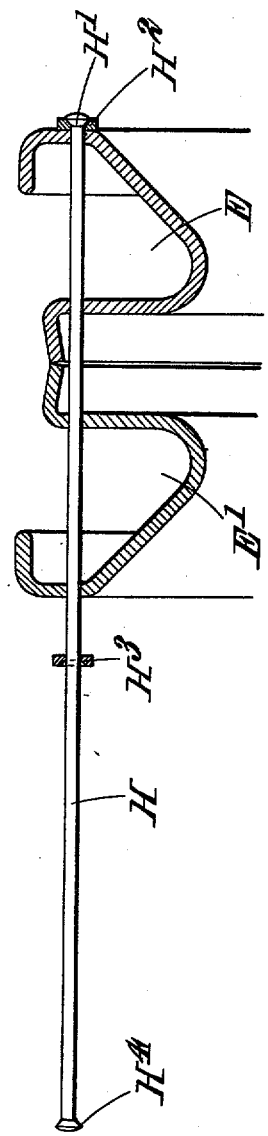

UNITED STATES PATENT OFFICE.

THOMAS SLOPER, OF DEVIZES, ENGLAND.

WHEEL-RIM FOR PNEUMATIC TIRES.

1,294,313.  Specification of Letters Patent.  Patented Feb. 11, 1919.

Application filed January 31, 1917. Serial No. 145,622.

*To all whom it may concern:*

Be it known that I, THOMAS SLOPER, a subject of the King of England, residing in Devizes, Wiltshire, England, have invented certain new and useful Improvements in Wheel-Rims for Pneumatic Tires, of which the following is a specification.

This invention is for improvements in or relating to wheel-rims for pneumatic tires and has for its object to provide a light wheel-rim which will be of greater strength for a given weight than those heretofore manufactured.

It is found when tires of large cross-section are employed on wheel-rims made of light-section steel such as is desirable for aircraft, that the inturned edges which accommodate the tire beads tend to open out under the pressure of the air in the tire.

The invention is not restricted to rims for aircraft, but it is particularly applicable to these as such wheels are exposed to abnormal stresses.

According to this invention, a rim for a pneumatic tire having side troughs to receive the beads and the spokes which troughs are permanently connected to the body of the rim, is characterized by ties which extend transversely across the troughs in such proximity to the inturned edges of the troughs that only sufficient space is left for tire-beads which are thin (relatively to the normal thickness of such beads) in the radial direction of the wheel whereby the ties are enabled to efficiently hold the outer wall of the troughs "in" against bursting thrust but in no way impede the removal of the tire.

Preferably each tie extends through both troughs and locks one outer wall to the other. The troughs may be separately formed as independent elements but are permanently secured to a central band-portion, for example by welding, which, with the troughs, completes the rim.

The invention further relates to a method of building up the rim made thus in three portions and having the troughs strengthened by ties, consisting in (*a*) threading the ties transversely through the troughs each tie extending through both troughs and one end of said ties being headed, (*b*) heading the other end after the threading has been effected, (*c*) separating the troughs and introducing a central band between them, and (*d*) permanently securing the ends of the band together and the troughs to the edges of the band, for example by welding.

In the accompanying drawings which illustrate one method of carrying out this invention:—

Fig. 2 is a section through a modified form of rim showing one of the transverse ties in place, and Fig. 3 shows the method of assembling the parts of the rim illustrated in Fig. 2.

The same letters indicate the same parts throughout the drawings.

Figure 1:
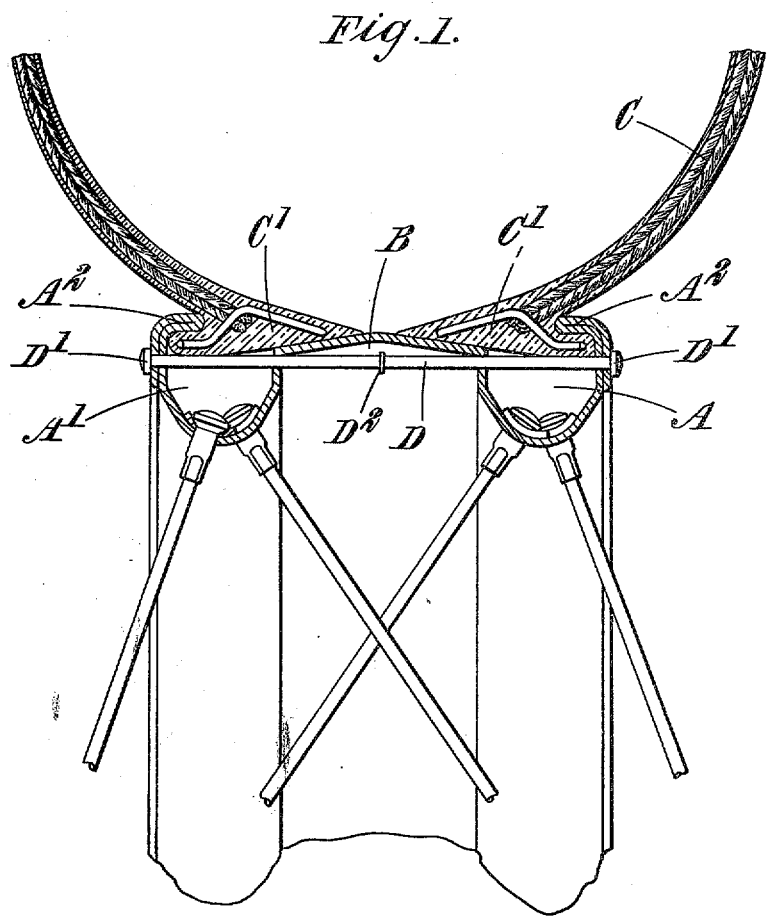
Figure 1 is a section through a rim showing one of the transverse ties in position and the bead-portions of a tire also in position.

The rim shown in Fig. 1 may be built up in any desired manner and is provided with side troughs A, $A^1$ whose bottoms lie lower than the central portion B of the rim, but the inturned edges $A^2$ lie sufficiently high to engage the beads $C^1$ of the tire C.

Transverse ties D are threaded through the troughs A, $A^1$, beneath the beads $C^1$ and the central rim-portion B. Any convenient number of these ties may be employed, and they are headed at $D^1$ to hold the outer walls of the troughs A, $A^1$ inward against bursting pressure exerted upon them by the tire.

The ties D greatly strengthen the troughs of the rim without adding much to the weight of the rim. The troughs could be strengthened by increasing the amount of metal put into them, but this would considerably add to the weight.

The rim shown in the drawings is shaped to take the beads of the well-known Palmer cord aero tires and it will be seen that these comfortably engage the upper parts of the troughs A, $A^1$ so that the ties D can be situated below them and below the central portion B of the rim and yet be sufficiently high to serve the purpose of holding in the walls of the troughs.

The ties D may be assembled in position by various means. Those shown in Fig. 1 are made in two parts which parts are threaded one through the trough A and the other through the trough $A^1$ and then joined at the middle by electrical welding, indicated at $D^2$. Instead of welding the two parts together, they could be screw-threaded and connected together by a nut having a right- and left-hand thread, by which nut the two parts would be drawn tightly into place or they could be made in one piece and the second head could be formed when the ties are in position.

Conveniently the rim is built up of three separate parts shown in Fig. 2, and comprising two side trough-members E E¹ respectively, and a central band F. The side troughs E, E¹ can be produced by rolling and may be either made endless or rolled from strip and joined afterward, say, by welding. The band F is provided with downwardly turned edges F¹ against which the edges of the troughs E, E¹ can butt and parts of the downwardly-turned edge are bent outward to form short tongues F² which rest upon the upper surface of the adjacent portions of the troughs E, E¹. The object of this construction is to provide a joint at which the central band F lies slightly higher than the abutting edge of the troughs so that a recess G is formed all along the joint which can be filled up with welding material; the lugs F² moreover serve to centralize the band F and strengthen the joint.

In building up this rim, the troughs E, E¹ first have all the ties H threaded through them, as shown in Fig. 3. The ties are all headed at H¹ and a washer H² is conveniently placed beneath the head. The ties are pushed forward so that the troughs lie at one end of them, as shown in Fig. 3, and a second washer H³ is then threaded on to each tie, after which the projecting end of the tie is headed at H⁴. This can easily be effected while the ties project beyond the rim-members as shown in Fig. 3. When the ties are all headed, the troughs E, E¹ are separated to opposite ends of the ties and then the central band F is introduced into place. This can be produced by rolling but is not endless, so that it can be readily brought into position, after which the ends are welded together. All that has to be done then is to join the troughs to the rims, and this is done by welding along the recess G, as already indicated. In Fig. 2 the parts are shown butted together, but when welded, the welding material would fill the recess G so that a comparatively smooth surface would be presented along the joint.

It will be appreciated that however the rim is formed, the troughs are either integral therewith or permanently secured thereto, so that they are virtually integral with the body portion, that is, the central portion of the rim, and the ties D or H only serve to hold the outer walls of the troughs in against bursting pressure and do not otherwise serve to hold the parts of the rim together. Various wheels have been proposed in which clamping rings to hold the tire in position on the central rim-member are secured in place by bolts, but the present invention does not relate to such constructions all of which are necessarily far too heavy for the purpose of this invention, and moreover have for their object to provide means for removing the tire, or the tire and an auxiliary rim, from the wheel, whereas the object of the present invention is to strengthen the rim, which necessarily must be kept as light as possible, against opening out under bursting pressure.

A further advantage of building up the rim in three parts, as indicated in Figs. 2 and 3, is that the troughs E, E¹ can be made of thicker material than the central band-portion F. It is these troughs which receive the spokes and therefore have to be perforated, so that the thickening of the troughs prevents them from being unduly weakened by the subsequent perforation. Again, by making the side troughs of thicker material, the tendency of the wheel to collapse by the rim being formed inward is reduced and its tendency to buckle is decreased. It will be understood, however, that such thickening is not intended to be sufficient to enable the troughs to withstand the bursting pressure, for which purpose the ties H are provided.

An important feature in the practical carrying out of this invention is that the ties must be placed as close to the inturned edge of the troughs as is possible so that the leverage exerted by the tire on the inturned edge is reduced to a minimum. For this reason only sufficient clearance is left between the ties and the inturned edges of the rim for tire-beads which are made thinner in the radial direction of the wheel than is the normal practice in motor tires, as is clearly shown in Fig. 1.

It has been proposed to secure the tires in metal wheel rims by so constructing the rim that the inturned edges which engage the tire could be sprung toward or away from each other for the purpose of holding or releasing the tire and such rims were to be provided with cross-bolts extending through one side of the rim and engaging the other side with a screw-thread so that by screwing up the bolts the tire could be firmly gripped between the said edges of the rim. To release a tire from such a rim it would be necessary to loosen all the aforesaid cross-bolts and the spokes necessarily are secured to the rim at a point intermediate of the sides in order that the latter may be able to spring freely in the manner referred to.

It will be seen that the ties of the rim constituting the subject-matter of the present invention in no way impede removal of the tire and therefore can be permanently fixed in position as the tire is held in place in the same manner as is present common practice. This invention, therefore, is quite distinct from that described above wherein the cross-bolts are used to pinch the tire between the two sides of the rim and entirely prevent its removal until they are released; no claim is made in the present specification for such a construction.

Another advantage of building up the rim on the ties as described is that by making all the ties to the proper length, they serve as distance-pieces to hold the parts correcently in position during the welding process.

What I claim as my invention and desire to secure by Letters Patent is:—

1. A wheel rim for pneumatic tires having side troughs for the reception of the heads of the spokes, which extend toward the center of the rim, the outer walls of the troughs being turned toward each other to form retaining lips for the beads of a tire, and transverse tie members extending through the troughs, between the tire receiving portion and the space for the spoke heads, said rods being arranged to prevent the side members thereof from spreading; substantially as described.

2. A wheel rim for pneumatic tires having side troughs for the reception of the heads of the spokes, which extend toward the center of the rim, the outer walls of the troughs being turned toward each other to form retaining lips for the beads of a tire, and tie rods extending through the troughs from one outer wall to the other outer wall between the tire receiving portion and the space for the spoke heads, said rods being arranged to prevent the outer walls from spreading with relation to each other; substantially as described.

3. A wheel rim for pneumatic tires having side troughs for the reception of the spoke heads, the bottoms of said troughs being nearer the center of the rim than the outer portions thereof, the outer wall of each of said troughs being turned over toward each other to form retaining lips for the beads of a tire, a tire supporting compression member between the inner walls of the troughs, and tie members extending through the four walls of the troughs to prevent the spreading thereof, said tie members extending through the walls between the space for the spoke heads and the tire receiving portion and forming a continuation of the compression member for supporting the tire; substantially as described.

4. A wheel rim for pneumatic tires having a trough at each side thereof for the reception of the heads of the spokes, the bottoms of said troughs being nearer the center of the rim than the outer portions thereof, the outer walls of said troughs being bent toward each other to form retaining lips for the beads of a tire, an arched tire supporting compression member between the inner walls of said rim, the outer diameter of said arched portion being as great as the inner diameters of the retaining lips, and a plurality of tie rods extending transversely through the four walls of the troughs between the space for the spoke heads and the tire receiving portion and forming a continuation of the tire supporting compression member for supporting the tire; subtantially as described.

In testimony whereof I have signed my name to this specification in the presence of two subscribing witnesses.

THOMAS SLOPER.

Witnesses:
Geo. Van Dyne,
H. S. Bursley.